United States Patent [19]

O'Rell et al.

[11] Patent Number: 5,066,537

[45] Date of Patent: Nov. 19, 1991

[54] PRINTING BLANKET CONTAINING A HIGH ELONGATION FABRIC

[75] Inventors: Dennis O'Rell, Boxboro; Parviz Hamed, Upton; Thomas C. DiPerna, Woburn, all of Mass.

[73] Assignee: W. R. Grace & Co.-Conn., New York, N.Y.

[21] Appl. No.: 592,762

[22] Filed: Oct. 4, 1990

[51] Int. Cl.[5] .......... B32B 7/00

[52] U.S. Cl. .......... 428/246; 428/257; 428/258; 428/259; 428/909

[58] Field of Search .......... 428/909, 246, 257, 258, 428/259

[56] References Cited

U.S. PATENT DOCUMENTS

| | | | |
|---|---|---|---|
| 1,327,757 | 1/1920 | Eggers . | |
| 1,327,758 | 1/1920 | Eggers . | |
| 3,700,541 | 4/1971 | Shrimpton et al. . | |
| 4,042,743 | 8/1977 | Larson | 428/909 |
| 4,061,818 | 12/1977 | Duckett et al. | 428/909 |
| 4,224,370 | 9/1980 | Heinemann | 428/246 |
| 4,303,721 | 12/1981 | Rodriguez | 428/213 |
| 4,471,011 | 9/1984 | Spöring | 428/909 |
| 4,537,129 | 8/1985 | Heinemann | 428/909 |
| 4,548,858 | 10/1985 | Meadows | 428/234 |
| 4,770,928 | 9/1988 | Gaworowski et al. | 428/284 |
| 4,812,357 | 3/1989 | O'Rell et al. | 428/246 |

*Primary Examiner*—James J. Bell

*Attorney, Agent, or Firm*—Chester Cekala; William L. Baker

[57] ABSTRACT

The present invention relates to improved compressible, offset printing blankets suitable for use on high speed web processors. These blankets have improved resistance to fall-off at the gap and also have improved resistance to surface piping subsequent to reverse rolling of the blanket. The instant printing blanket comprises a carcass layer, a compressible layer overlaying the carcass layer, a stabilizing layer overlaying the compressible layer and an ink transfer layer upon the compressible layer, wherein the stabilizing layer is formed of a fabric having a plurality of continuous filament synthetic warp yarns, preferably nylon or polyester, following a sinusoidal path over and under the weft yarns.

23 Claims, 1 Drawing Sheet

PRINTING BLANKET CONTAINING A HIGH ELONGATION FABRIC

FIELD OF THE INVENTION

The present invention relates to a multi-layer, compressible printing blanket. Specifically, the present invention relates to printing blankets used in offset lithographic printing.

BACKGROUND OF THE INVENTION

In lithographic printing, a printing blanket is employed to transfer printing ink from the printing plate to the article being printed, such as paper, plastic or metal films, or other such materials.

Compressible printing blankets are normally employed on high speed, multicolor web presses to allow for maximum print sharpness and operating latitude. In order to provide good register control, that is, the relative placement of the various colors to one another, it has been found necessary to employ a stabilizing layer between the compressible layer and the top, ink transfer surface rubber layer. The stabilizing layer may be either a textile fabric layer and/or a high modulus rubber film. See, for example: U.S. Pat. No. 1,327,757 to Dunkley; U.S. Pat. No. 1,327,758 to Dunkley et al.; U.S. Pat. No. 3,700,541 to Dunkley et al., issued Oct. 10, 1972; U.S. Pat. No. 4,471,011 to Sporing, issued Sept. 11, 1984; U.S. Pat. No. 4,042,743 to Larson et al., issued Aug. 16, 1977; U.S. Pat. No. 4,061,818 to Duckett et al., issued Dec. 6, 1977; and, U.S. Pat. No. 4,770,928 to Gaworowski et al., issued Sept. 13, 1988. The use of a hard rubber layer to provide the required dimensional stability has been taught by U.S. Pat. No. 1,327,758 to Dunkley; U.S. Pat. No. 1,327,758 to Dunkley et al.; U.S. Pat. No. 4,303,721 to Rodriguez, issued Dec. 1, 1981; and, U.S. Pat. No. 4,812,357 to O'Rell et al., issued Mar. 14, 1989.

The use of a fabric layer between the ink transfer surface layer and the compressible layer has provided the desired level of register control and web feed necessary for today's high speed presses, normally operating in excess of 1,500 feet per minute. However, a major problem encountered in using blanket constructions which contain fabric between the surface rubber layer and the compressible layer is a phenomena referred to as "fall-off at the gap". This is the result of the top reinforcing fabric having insufficient stretch to accommodate the change in geometry when the blanket is tucked into the cylinder gap and tightened. The fall-off at the gap results in a loss of print at the end or beginning of a page, which is deemed to be unacceptable to commercial printers. From a geometrical perspective, it can be seen that the closer the fabric reinforcing layer is to the surface of the blanket, the greater its length has to be in order to accommodate being tucked into the cylinder gap without a corresponding loss in caliper. In many commercial constructions currently used today, surface rubber thicknesses range from 0.012–0.016 inches in order to reduce the path length of the top stabilizing fabric and thus minimize the fall-off at the gap phenomena.

SUMMARY OF THE INVENTION

One feature of this invention is to provide a compressible, offset printing blanket suitable for use on high speed web presses, which may be operated under tensions varying from 25 to 225 pounds per inch, having improved resistance to fall-off at the gap.

Another feature of this invention is to provide a printing blanket having improved resistance to fall-off at the gap wherein the stabilizing layer between the ink transfer layer and the compressible layer is comprised of a tentered, heatset fabric having high stretch in the warp direction and preferably low stretch in the weft direction.

Another feature of this invention is to provide a printing blanket having improved resistance to "piping" on reverse rolling, which incorporates a continuous filament, woven fabric having high elongation in the warp direction.

It is another feature of this invention to provide a compressible printing blanket having improved web feed, register control properties and improved resistance to fall-off at the gap comprised of a dimensionally stable carcass layer, a foamed rubber compressible layer having a thickness greater than 0.012 inches, a reinforcing fabric layer which has high elongation in the warp direction and preferably low elongation in the weft direction, and a surface rubber.

It is another feature of this invention to provide a printing blanket wherein the fabric stabilizing layer between the compressible layer and the surface rubber layer has been stretched in the cross machine direction and heatset such that the warp threads follow a sinusoidal path and cross an imaginary line in the fabric at an angle greater than 12°.

An additional feature of this invention is to provide a printing blanket having improved resistance to "piping" on reverse rolling and improved resistance to fall-off at the gap, resulting from the present blanket's use of a texturized continuous filament warp yarn in the reinforcing fabric layer between the ink transfer layer and the compressible layer.

DETAILED DESCRIPTION OF THE INVENTION

Figure 1:
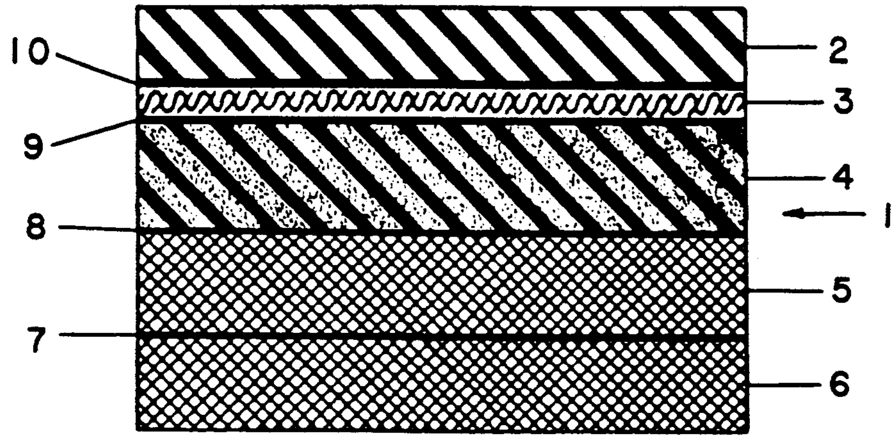
FIG. 1 represents a cross section, greatly enlarged, of a printing blanket of the current invention.

Referring to FIG. 1, the compressible printing blanket 1 may be seen to comprise of a number of difference layers laminated together including the surface rubber or ink transfer layer 2, which is adhesively bonded 10 to a stabilizing layer 3, which in turn is adhesively bonded 9 to the compressible layer 4, which is bonded 8 on its opposite face to a dimensionally stable carcass comprised of fabric layers 5 and 6.

Figure 2:
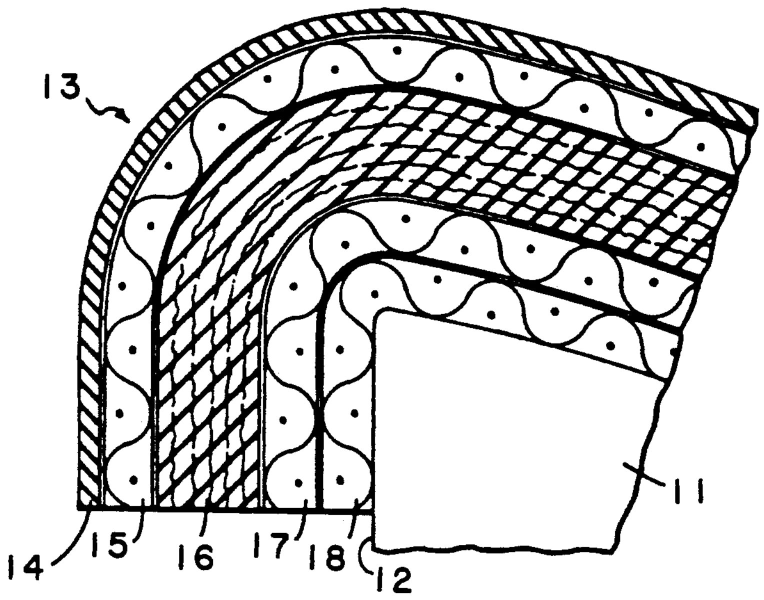
FIG. 2 shows a portion of the blanket cylinder with a blanket being tucked into the cylinder gap.

Referring to FIG. 2, when blankets 13 are mounted on a printing press, the ends of the blankets are typically inserted into an axially oriented slot on the blanket cylinder and engaged into a tightening mechanism. The blankets are then tensioned onto the cylinder using forces ranging from 25 to 225 pounds per inch of width, with most of the forces being borne by the fabric layers 17 and 18 in the carcass. During the initial construction and fabrication of the blanket, the fabric layers 17 and 18 are bonded to fabric layer 15 through compressible layer 16 with all of the layers being essentially in a flat configuration. When the blanket is wrapped around the cylinder gap, it can be seen that the radius of curvature increases as one proceeds from the cylinder surface outward through the blanket, such that fabric layer 17 has a greater distance to travel versus fabric layer 18, while fabric layer 15, which is positioned atop the compressible layer 16 has an even greater circumferential path than the two fabric layers closest to the surface of the printing blanket cylinder. Since normal woven fabrics typically have low warp direction elongations, the higher tensions placed on fabric layer 15 will cause a partial collapse of compressible layer 16 adjacent to the edge of the cylinder gap 12. The compression of the compressible layer 16 immediately adjacent to the cylinder gap 12 results in a phenomena referred to as "fall-off at the gap".

In order to provide a compressible printing blanket having good web feed properties and resistance to fall-off at the gap, it has been discovered that the fabric layer between the compressible layer and the surface rubber must have high elongation in the warp direction and relatively low elongation in the weft direction.

DESCRIPTION OF THE PREFERRED EMBODIMENT

The stabilizing layer 3 of the present printing blankets are formed of woven fabric having high elongation characteristics in the machine direction (warp). The stabilizing layer has an ultimate warp direction elongation at break greater than 20%, preferable greater than 30%, most preferable greater than 40%. Elongation at break is measured according to Test Method D-1682, incorporated herein by reference. Suitable fabrics can be made from synthetic materials such as polyamides (e.g., Nylon 6; Nylon 6,6; Nylon 6,9; Nylon 6,10; Nylon 6,12; Nylon 11), rayon polyester, polypropylene, or other polyolefinic fibers, carbon fibers, aromatic polyamides, including aramid or Kevlar ®-type fibers, glass, metal, other inorganic fibers, or mixtures of synthetic fibers. The preferred stabilizing fabric is nylon or polyester. Most preferred fabrics are comprised of nylon. It is also possible to fabricate fabrics of different warp and weft yarns. Hence, the weft yarns can further comprise spun yarns of cotton or cotton blends. Multi-filament yarns made from continuous synthetic fibers are used in the warp direction. Mono-filament or multi-filament yarns may be used in the weft direction, however, multi-filament weft yarns are preferred. The continuous, multifilament yarns of the present invention may additionally be textured using processes well known in the textile industry. The stabilizing layer thickness is less than about 0.008 inches, preferably less than about 0.006 inches.

Figure 3:
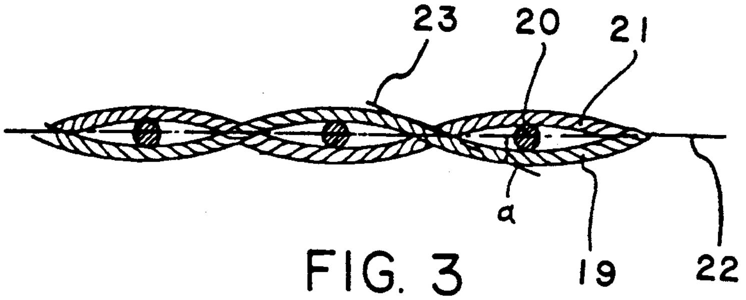
FIG. 3 shows a cross section of a tentered, heatset fabric cut parallel to the warp direction threads used in producing a blanket of the present invention.

Referring to FIG. 3, the stabilizing fabric of the present invention is prepared by interweaving warp 19 and 20 and weft 20 yarns. These yarns range from about 0.002 inches to about 0.005 inches in diameter. (Preferably about 0.002 to about 0.003 inches). Most preferably a 70 denier nylon thread is used in the warp direction. Furthermore, it is preferable to have weft yarns of greater diameter (higher denier) than the warp yarns. It is still further preferred that the fabric have greater than about 50 warp threads per inch. Within the blanket the warp threads 19 and 20 of the stabilizing layer follow a generally sinusoidal path over and under the weft threads 20.

One way of measuring the amplitude of the sinusoidal path is to measure the angle alpha at which the warp threads intersect 25 the centerline of the fabric 22. The stabilizing fabrics of the present invention intersect the centerline at an angle of at least 12°, preferably at least 15°, most preferably at least 18°.

Weft threads may follow a similar sinusoidal path over and under the warp threads or they may be coplanar. However, the sinusoidal path of the weft must have a smaller amplitude than the warp thread path to avoid the piping problem described earlier.

Stabilizing fabrics with the above characteristics can be produced by a variety of methods. One way is to scour a fabric to remove weaving aid and to heat set it at a temperature greater than about 100° C. (preferably from about 125° C. to about 200° C. depending upon the composition of the fibers) at a tension of less than 10 lbs/in. in the warp direction. This fabric can then be affixed between the compressible layer and the ink transfer layer using conventional techniques known in the printing blanket art.

When printing blankets are being mounted on the cylinder, it is not uncommon for them to be rolled into a tube with the ink transfer layer inside in order to guide the blanket around the cylinder and into the cylinder gap. This is referred to as "reverse rolling". When typical blankets comprising a continuous filament synthetic fabric stabilizing layer are reverse rolled, the resulting printing blanket surface on the roll shows deformities or ripples oriented parallel to the weft direction. These deformities are called "piping". Blankets which are placed on the cylinder without reverse rolling are free of piping.

Surprizingly, we have discovered that the printing blankets of the present invention are resistant to the piping problem upon reverse rolling. Without being bound to theory, we believe the piping phenomenon to be related to the stabilizing layer's ability to compress in the warp direction upon reverse rolling. In typical blankets comprising a synthetic stabilizer, the warp threads of the stabilizer are tentered into a coplanar pattern which allows for very little compression when the blanket is rolled in the reverse direction (ink transfer layer to the inside). By contrast, the instant fabrics are heat set under minimum tension, especially in the warp direction. As a result, the instant blanket's stabilizing layer can compress and return to its sinusoidal pattern easily upon reverse rolling. Thus, leaving no piping artifacts on the blanket surface.

Printing blankets according to the present invention also comprise a carcass layer 5 and 6, a compressible layer 4 and an ink transfer layer 2. These layers are further described as follows:

The carcass layer shown as 5 and 6 is a laminate of two or more fabric layers, adhesively bonded together. The first fabric layer 6 and the second fabric layer 5 are formed of a conventional woven fabric having low elongation characteristics in the machine (warp) direction. Suitable fabrics can be made from natural materials such as cotton or rayon, synthetic materials such as polyester, polypropylene or other polyolefinic fibers, polyamides, including aramid or Kevlar ® type fibers, glass, metal and other inorganic fibers or mixtures of natural and synthetic fibers. The selected weave can be any conventionally used in printing blankets such as a duck, twill, plain or drill so long as it can be processed to provide the desired low elongation characteristics in the machine direction.

Each of the fabric layers, 5 and 6, are preferably formed of woven cotton fabric having a thickness from about 8 mils to about 25 mils, preferably about 11 mils to 16 mils in thickness. The ultimate machine direction elongation at break of the selected fabric should be from about 2% to about 8%, preferably about 4% to 6%.

Preferably, the layers are bonded together by a suitable adhesive, though other methods of bonding may also be used. One method of forming the laminated carcass layer is to coat the inner surfaces of the fabric layers 5 and 6 with an adhesive and allow the adhesive to bond the layers together. Preferably, an amount of pressure sufficient to ensure overall bonding should be used. More preferably, when one wishes to minimize the overall thickness of the laminate, additional pressure, such as can be obtained from a rotocure or a high pressure lamination press, may be used.

The compressible layer 4 is attached to the outer surface of the fabric layer 5. By "compressible", it is meant to include both "compressible", i.e. when the material is subjected to pressure it falls in upon itself, and also "deformable", i.e. the material is displaced laterally when subjected to pressure. This layer 4 may either be foamed or unfoamed. The layer 4 may be formed of any elastomeric material which has good integrity and resilience. The layer should be greater than about 0.007 inches, preferably from about 0.008 to about 0.030 inches in thickness, more preferably from about 0.015 to about 0.025 inches.

Suitable elastomeric materials include natural rubber, synthetic rubbers, such as nitrile rubbers, styrene-butadiene copolymers, polybutadiene, acrylic rubbers, various olefinic copolymers including ethylene-propylene rubbers, polyurethanes, epichlorohydrins, chlorosulfonated polyethylenes, silicone rubbers and fluorosilicone rubbers. A nitrile rubber based compressible layer is preferred. Additional ingredients commonly added to rubber compositions such as fillers, stabilizers, pigments, plasticizers, crosslinking or vulcanizing agents and blowing agents may be used in this layer.

The compressible layer, if foamed, may have either a closed or open cell structure. The preferred compressible layer is formed of a closed cell foam of nitrile rubber. Such a layer and methods of making it are taught in U.S. Pat. No. 4,303,721 to Rodriguez, issued Dec. 1, 1981; U.S. Pat. No. 4,548,858, to Meadows, issued Oct. 22, 1985; U.S. Pat. No. 4,770,928 to Gaworowski et al., issued Sept. 13, 1988; and U.S. Pat. No. 4,042,743 to Larson et al., issued Aug. 16, 1977, which are all incorporated herein by reference in their entirety.

The compressible layer 4 is attached to the carcass layer 5 by various means including an adhesive such as a nitrile adhesive or by direct bonding and crosslinking of the compressible layer 4 to the upper surface of the outer layer 5 of the carcass layer 8. It may also be produced as taught in U.S. Pat. No. 4,548,858 to Meadows, issued Oct. 22, 1985.

The upper stabilizing layer, 3, is inserted and bonded to the compressible layer 4. This layer provides the blanket with additional stability and also modifies its ability to transport paper through the printing nip.

An ink transfer surface layer 2 is bonded to the upper surface of the stabilizing layer 3. This may be achieved by an adhesive layer, for example a nitrile based adhesive. The layer 2 may be comprised of any of the materials described for use in the compressible layer 4, but should not be foamed and preferably is void free. The layer should be from about 0.001 to about 0.020 inches in thickness, preferably about 0.005 to about 0.001 inches in thickness and have a durometer of from about 40 to about 60 SHORE A hardness.

The overall thickness of the blanket shown in FIG. 1 should be similar to that of a conventional 3-ply blanket, namely from about 0.065 to about 0.069 inches but may be from about 0.034 to about 0.100 inches thick. The ultimate elongation of the blanket at break in the machine (warp) direction should be from about 3% to about 8%. The ultimate elongation of the blanket in the cross machine direction should be from about 10% to about 50%, more preferably from about 10% to about 20%.

As mentioned hereinabove, an adhesive may be used to bond the respective layers together. Any adhesive that is compatible with the various layers and provides a strong, permanent bond may be used. Suitable adhesives include but are not limited to cured or curable elastomeric adhesives comprised of an elastomer such as synthetic rubbers, including nitrile rubbers, silicone and fluorosilicone rubbers, polyacrylic polymers, polyurethanes, epichlorohydrins and chlorosulfonated polyethylenes. A nitrile rubber based adhesive is preferred.

The printing blanket can be formed by a variety of methods. One method is to form a laminate of all of the respective layers in their proper position with a suitable adhesive between each layer and bond the blanket together with heat or pressure or both. A preferred method is to form the carcass first by coating the inner surface of each with a suitable adhesive. The sandwich is then laminated together using equipment well known in the art, including a laminator, a rotocure or lamination press so as to subject the laminate to sufficient pressure and temperature to form a carcass, the overall thickness of which is equal to or less than the sum of the thickness of the individual layers. The compressible layer is then coated onto the upper surface of the carcass and bonded thereto and/or if desired, foamed in place. If necessary or desired, the compressible layer is then ground to a desired caliper. An adhesive coating is applied to the top of the compressible layer, the stabilizing layer is applied, more adhesive is applied, and an ink transfer layer is then coated onto the adhesive layer and cured.

EXAMPLE I

The effect of tension used in heatsetting a nylon fabric is evaluated using blanket samples produced in the laboratory. The samples are prepared by starting with a partial compressible blanket construction comprised of two carcass layers of prestretched cotton fabric and a foamed nitrile rubber compressible layer. This is prepared following the general procedures outlined in U.S. Pat. No. 4,303,721 to Rodriguez, issued Dec. 1, 1981, incorporated herein by reference. The foam layer is ground to yield an overall composite thickness of approximately 0.057 inches.

Two pieces of ground foamed material are rod coated with a 0.002 inch thick sulfur curable nitrile rubber based adhesive. One piece (Sample 1) is laminated to a piece of nylon stabilizing fabric which has been heatset under high warp direction tension (greater than 10 lbs/in.) while the second piece (Sample 2) is laminated to a piece of nylon stabilizing fabric which has been heatset under high weft (fill) direction tension and low (less than 10 lbs/in.) warp tension. Each sample is then coated with additional adhesive and then with a nitrile rubber based ink transfer layer. The adhesive layer on top of the nylon is approximately 0.002 inches thick and the surface rubber (ink transfer layer) is approximately 0.006 inches thick. Both samples are cured under sufficient pressure, temperature and time to yield a though, resilient, well bonded structure.

The effect of different nylon processing conditions on blanket properties is evaluated using two pieces of nylon fabric taken from the same piece of greige fabric prepared from 70 denier continuous filament nylon yarn. Sample 1 was scoured and heat set under high warp tension (typical fabric), while Sample 2 was scoured and heat set under high weft tension and low warp tension (present invention). The results are shown below:

| | Stabilizing Layer Material | Piping on Reverse Rolling | Simulated Fall-off at the Gap (Caliper (inches × 1000) at X lbs/in. when tension around 0.8" radius fixture) 25 | 50 | 75 | 100 | 125 |
|---|---|---|---|---|---|---|---|
| Sample 1 | Nylon heat set under high warp tension. Warp thread angle alpha of 10° | Yes | 73 | 72 | 71.5 | 70.5 | 70.0 |
| | | | | | −1.5 | −2.5 | −3.0 |
| Sample 2 | Nylon heat set Under high weft tension. Warp thread angle alpha of 20° | No | 71.5 | 71.0 | 70.5 | 70.0 | 69.5 |
| | | | | | −1.0 | −1.5 | −2.0 |
| Commercial Blanket 1 | Cotton Fabric | No | 66.5 | 65.0 | 63.7 | 63.3 | 61 |
| | | | | | −3.5 | −3.5 | −5.5 |
| Commercial Blanket 1 | Cotton Fabric | No | 65 | 64 | 63 | 63 | 62 |
| | | | | | −2.0 | −2.0 | −3.0 |

EXAMPLE II

A partial compressible blanket construction comprised of two carcass layers of prestretched cotton fabric and a foamed nitrile rubber compressible layer, all adhesively bonded together is prepared following the general procedures outlined in U.S. Pat. No. 4,303,721 to Rodriguez, issued Dec. 1, 1981 incorporated herein by reference. The foam layer is ground to obtain an overall composite thickness of approximately 0.051 inches.

The ground foamed surface is then knife coated with a sulfur curable nitrile rubber based adhesive dissolved in a suitable organic solvent to provide 0.002 inches of adhesive, and a total composite thickness of 0.053 inches. The adhesive solution is coated onto the ground foamed surface in about 0.003 inch thick wet coatings and the solvent removal is accelerated by heating to about 250° F. for about 60 seconds. Two separate coating passes are required. Proper precautions are taken to prevent the adhesively coated partial blanket construction from sticking to itself when being wound up after coating.

The adhesively coated formed rubber carcass is laminated to a scoured, heatset continuous filament nylon fabric having the following properties:

| | |
|---|---|
| Warp thread | 70 denier nylon |
| Weft thread | 70 denier nylon |
| Thread count | |
| Warp | 106 threads/inch |
| Weft | 101 threads/inch |
| Elongation (%) | |
| Warp | 48-52 |
| Weft | 50-55 |
| Ultimate tensile (lbs/in 1", ravel strip) | |
| Warp | 78-79 |
| Weft | 61-65 |
| Heatset Conditions | |
| Tension | |
| (lbs/in, warp direction) | 10 (max) |
| Temperature (°F.) | 300 (min) |
| Thickness (inches) | 0.004 |

The lamination process is carried out under minimum tension (just sufficient to prevent fabric wrinkling) at a temperature of approximately 300° F. and at sufficient pressure to assure good flow of the adhesive into the nylon fabric.

The partial blanket construction having a layer of fabric over the foamed nitrile rubber layer is then coated with additionally adhesive, the same as used to coat the foamed rubber layer, using a knife coating process. The dried adhesive thickness is 0.002 inches. The dried adhesive layer on top of the fabric is then coated with a rubber cement formulated to provide an ink receptive layer. The surface rubber is coated in repeated passes until its thickness is 0.011 inches and the total thickness is 0.068. The surface rubber and top fabric adhesive layers are cured by heating to a temperature greater that 250° F. for more than two hours and under sufficient pressure to yield good bonding between the various layers.

Blankets prepared with the stabilizing fabric layer between the compressible foam layer and the ink transfer layer are mounted on a four color Harris M1000 press (manufactured by Harris Graphics, Dover, New Hampshire) and are found to print satisfactorily. These blankets also showed increased web feed properties as packing heights are increased and little register movement when paper splices went through the press. The blankets do not exhibit any fall-off of print quality near the blanket cylinder gap due to blanket caliper collapse.

What is claimed is:

1. A printing blanket comprising a carcass layer, a compressible layer overlaying the carcass layer, a stabilizing layer overlaying the compressible layer and an ink transfer layer upon the stabilizing layer, wherein the stabilizing layer is formed of a fabric having a plurality of continuous filament synthetic warp yarns following a sinusoidal path over and under the weft yarns.

2. A printing blanket according to claim 1 wherein the warp yarns of the stabilizing layer pass through an imaginary center line of the stabilizing fabric at an angle greater than 12°.

3. A printing blanket according to claim 2 wherein the warp yarns of the stabilizing layer pass through an imaginary center line of the stabilizing fabric at an angle greater than 15°.

4. A printing blanket according to claim 3 wherein the warp yarns of the stabilizing layer pass through an imaginary center line of the stabilizing fabric at an angle greater than 18°.

5. A printing blanket according to claim 2 wherein the stabilizing layer has an ultimate elongation at break greater than 20%.

6. A printing blanket according to claim 5 wherein the stabilizing layer has an ultimate elongation at break greater than 30%.

7. A printing blanket according to claim 6 wherein the stabilizing layer has an ultimate elongation at break greater than 40%.

8. A printing blanket according to claim 5 wherein the warp yarns of the stabilizing layer are selected from the group consisting of continuous filament synthetic yarn of polyamides, polyolefinic fibers, aromatic polyamides, glass, rayon, carbon fiber, metal and mixtures thereof.

9. A printing blanket according to claim 8 wherein the weft yarns of the stabilizing layer are selected from the group consisting of spun yarns comprised of cotton, continuous filament synthetic yarn of polyamides, polyolefinic fibers, aromatic polyamides, glass, rayon, carbon fiber, or metal, or mixtures thereof, and blends of synthetic and spun yarns.

10. A printing blanket according to claim 9 wherein the yarn diameter ranges from about 0.002 to about 0.005 inches.

11. A printing blanket according to claim 9 wherein the thickness of the stabilizing layer is less than 0.008 inches.

12. A printing blanket according to claim 11 wherein the thickness of the stabilizing layer is less than 0.006 inches.

13. A printing blanket according to claim 1 wherein the stabilizing layer is prepared from a fabric having continuous filament nylon or polyester warp yarns and weft yarns, wherein the fabric has been heat set at a temperature greater than 100° C. and at a tension of less than 10 lbs/in. in the warp direction.

14. A printing blanket according to claim 11 wherein the thickness of said compressible layer is greater than about 0.007 inches.

15. A printing blanket according to claim 14 wherein the thickness of said compressible layer is from about 0.008 to about 0.030 inches.

16. A printing blanket according to claim 15 wherein the thickness of said compressible layer is from about 0.015 to about 0.025 inches.

17. A printing blanket according to claim 8 wherein the warp yarns of the stabilizing layer are comprised of a textured, continuous filament synthetic yarn.

18. A printing blanket according to claim 17 wherein the warp yarns of the stabilizing layer are comprised of nylon or polyester.

19. A printing blanket according to claim 9 wherein the weft yarns are larger in diameter than the warp yarns.

20. A printing blanket according to claim 1 wherein the stabilizing layer is prepared from a fabric having a continuous filament warp yarn and a weft yarn that is larger in diameter than the warp yarn.

21. A printing blanket according to claim 1 wherein the stabilizing layer is prepared from a fabric having a texturized continuous filament warp yarn and a weft yarn that is larger in diameter than the warp yarn.

22. A printing blanket prepared according to claim 9 wherein the stabilizing layer is prepared from a fabric having greater than 50 warp threads per inch.

23. A printing blanket comprising a carcass layer, a compressible layer overlaying the carcass layer, and a stabilizing layer positioned between the compressible layer and the ink transfer layer, wherein the stabilizing layer is comprised of texturized continuous filament synthetic warp yarns which follow a sinusoidal path over and under the weft yarns, and said stabilizing layer has ultimate elongation at break greater than 30%.

* * * * *